United States Patent [19]

Clark

[11] 3,855,737

[45] Dec. 24, 1974

[54] AUTOMATICALLY ADJUSTABLE BLOCKING DEVICE

[75] Inventor: James A. Clark, Mendon, N.Y.

[73] Assignee: Bausch & Lomb Incorporated, Rochester, N.Y.

[22] Filed: Nov. 20, 1972

[21] Appl. No.: 308,210

[52] U.S. Cl. .................. 51/216 R, 269/8, 269/310
[51] Int. Cl. .......................... B24b 14/06, B23g 3/00
[58] Field of Search........... 51/216 R, 216 P, 217 R, 51/217 P, 217 L, 277, 281 R, 283; 269/7, 8, 310-314

[56] References Cited
UNITED STATES PATENTS

| 685,204 | 10/1901 | Ewen | 51/240 GB |
|---|---|---|---|
| 1,254,044 | 1/1918 | Johnson | 269/310 X |
| 1,908,104 | 5/1933 | Bell | 51/163 |
| 1,911,153 | 5/1933 | Hill | 51/277 X |
| 2,770,823 | 11/1956 | Kamborian | 269/8 |
| 3,729,810 | 5/1973 | Piechocki | 269/310 X |

Primary Examiner—Al Lawrence Smith
Assistant Examiner—James G. Smith
Attorney, Agent, or Firm—Frank C. Parker; Bernard D. Bogdon; DeWitt M. Morgan

[57] ABSTRACT

Apparatus for and method of blocking a work piece which is to be mechanically worked upon. The work piece is supported in a stress free condition by a blocking device having movable elements at least some of which are engageable with a surface of the work piece to assume the contour of this surface. The blocking device is also provided with a mechanism to lock the movable elements in the contoured position.

13 Claims, 6 Drawing Figures

AUTOMATICALLY ADJUSTABLE BLOCKING DEVICE

Almost all plate glass presently available is made by a float technique wherein molten glass is flowed onto a long, molten, liquid tin bed at the ingress of the molten glass. As the molten glass is moved out over the length of the tin bed, the glass cools until it finally solidifies and can then be cut into sheets. Glass manufactured by this method is slightly wavy in cross section having waves of average amplitude in the order of 0.001 inches and a period of 2–5 inches or more.

While the surface of such float glass can be considered flat for most applications it is not optically flat enough where the application specification requires that the glass surface be extremely flat. Some specifications for such optical application require that at least one surface be flat to within 4 fringes of power and 2 fringes of irregularity over a 2 inch diameter area. Other cases may require that the surface be flat to within 2 fringes of power and a fringe of irregularity over a 2 inch diameter area. Still other specifications may require fractional fringe flatness over even larger areas. Even untreated polished plate glass, at the mentioned degree of flatness, will not meet the specifications.

An early process which is still used to achieve the required extreme degree of flatness supports the float glass on a grinding (or polishing) surface and then places a layer of foam rubber upon the exposed surface of the glass plate. A metal backing plate, of sufficient weight to force the layer of foam rubber to conform to and exert force over the total surface of the glass plate, is superposed on the exposed surface of the rubber. After the rubber and backing plate have been placed upon the glass plate an attempt is made to grind or polish the bottom surface of the glass plate to the desired degree of flatness. However, this process exerts substantial pressure on the glass plate, and since the plate is usually thin, perhaps 1/4 inch in thickness, causes the plate to flatten out on both its surfaces. If the force on the glass is great enough all areas of the glass will have substantially the same amount of material removed by the grinder and therefore after the pressure is removed the memory of the glass will cause it to return to its wavy condition.

Another method of grinding and/or polishing a float glass plate supports the float glass in a bed of hot pitch whose abutting surface conforms to the butted glass surface. Since this process utilizes hot pitch, the glass is subject to thermal stresses which distort the glass. Furthermore, if the pitch has varying thicknesses it will shrink in a non-uniform way as it cools, mechanically distorting the glass which cue to the elastic memory of the glass will cause distortions when the glass is removed from the pitch after grinding.

The patent issued to Zobel et al U.S. Pat. No. 2,693,065 issued Nov. 2, 1954 discloses a means of supporting a glass plate using screws which are engaged in threaded holes in a base and against the glass work plate. The screws support the entire surface of the plate uniformly without causing any bending or deformation. However, as is evident from column 5, the paragraph beginning at line 51, the plate is under stress and is distorted when the screw support is applied. The threading of the screws and of the holes must be very fine since micro-adjustments are required. Obviously screwing each of these screws into a delicate touch relation with the glass plate is a non-automatic, time consuming and exacting chore and machining such screws and opening is a costly operation.

Another method of blocking is to float the glass plate on a bed of liquid plaster which will solidify holding the plate securely. In this method there is a problem of removing plaster which adheres to the glass or to the blocks. There is also the possibility of distortion of the glass due to uneven solidification or shrinkage of the plaster.

The blocking fixtures hereof support the object to be worked in its free, undistorted form. They may be used to support metals, plastic or ceramics as well as glass. In certain forms, the blocking fixture is engaged to the work piece while the work piece is held as close as possible to the equivalent of neutral buoyancy. Blocking may then be accomplished by supporting the work piece on pins. Moving the pins against the walls of apertures and holes fixes the position of these movable elements in the position in which they conform to the contours of the work piece surface. Different means such as sponge rubber or mercury are disclosed for holding the work piece while the movable elements are engaged with the work piece. Alternately, the object to be worked on may be blocked by an oil and iron powder mixture, by small ball bearings (1/32 inch in diameter or smaller) or by particles such as sand. In the case of the oil and iron powder mixture the application of a magnetic field fixes the configuration which is imparted into it by the work piece.

This invention relates to element blocking devices and has particular reference to improved means for blocking optical elements whose surfaces are to be ground and/or polished to a very high degree of flatness.

An object of the present invention is to block a work piece in its free form state without subjecting it to heat and/or mechanical stresses.

A further object of the invention is to provide a glass plate having an extremely flat surface.

Another object of the invention is the provision of an apparatus for blocking an optical element for grinding and/or polishing operations utilizing axially movable elements or portions that are positioned under the force of gravity.

A still further object of the invention is to provide an apparatus for blocking an optical element for ginding and/or polishing operations utilizing pins as support elements. The pins are fixed in position after engagement with the optical element.

Another object of the invention is to provide a method of polishing or grinding an optical element including the steps of blocking the element in its free form state without subjecting it to heat and/or mechanical stresses.

A still further object of the invention is to block a work piece using elements which automatically engage the work piece and assumes the surface contour of the work piece.

Figure 1:
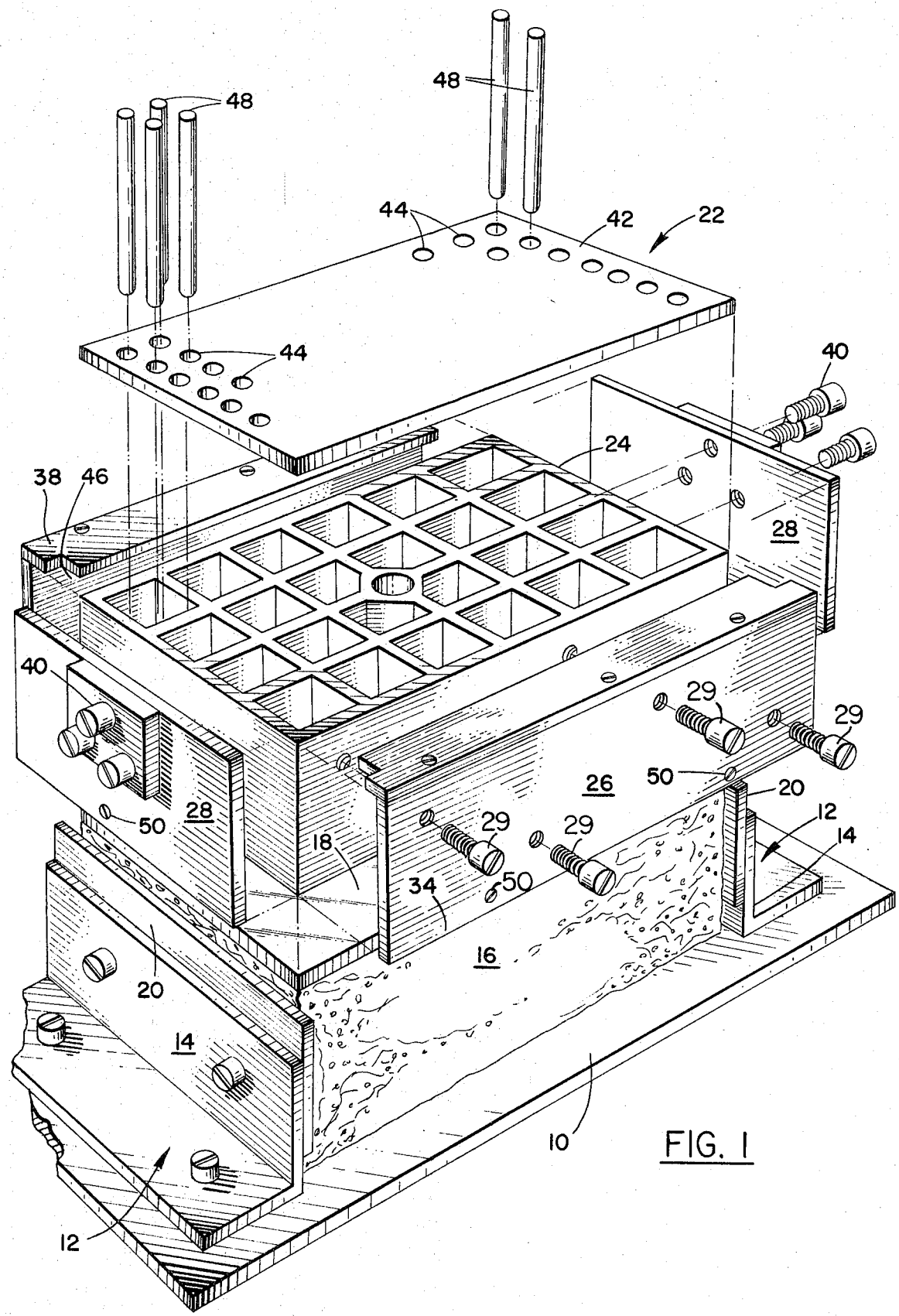
FIG. 1 is an exploded view of a blocking fixture embodying one form of the invention.
Figure 2:
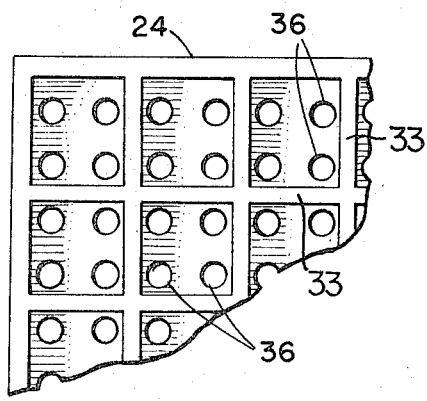
FIG. 2 is a top plan view, broken off, of the pin block of the blocking fixture shown in FIG. 1.
Figure 3:
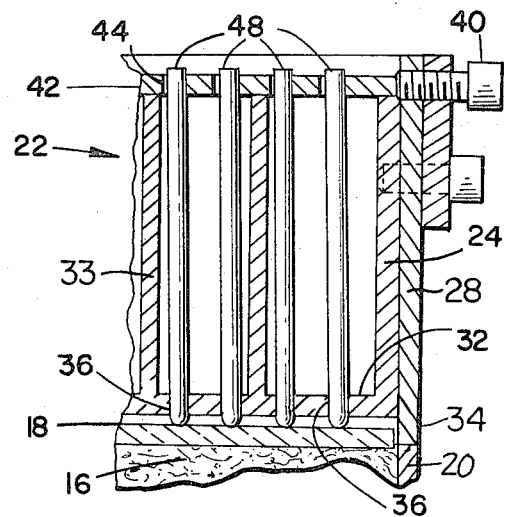
FIG. 3 is a section, broken off, of the pin block of the blocking fixture shown in FIG. 1.

There is shown in the drawings particularly at FIG. 1 – 3 a two piece, blocking fixture, in this case used for blocking a glass plate, comprising, as a first piece, a surface mounting plate 10 which is a thin, flat rectangular metal plate having a pair of spaced, right angle support members 12 attached thereto. A leg 14 of each of the support members 12 extends upwardly in right angle relation to the plane of the surface mounting plate 10 and in parallel relation to each other. A very soft, sponge block 16 is placed on the surface of the mounting plate 10 in the area defined by the legs 14 of the support members 12. It is extremely important that the sponge block 16 should be very pliable to literally float the glass work plate 18, at neutral buoyance. The glass work plate 18 is placed on the sponge block 16 with one surface exposed for engagement with the movable support portions and the other surface abutting the sponge block 16 to be ground and/or polished (i.e., the surface which was exposed to the air during the float casting process is placed against the sponge block). An adjustable rectangular arm 20 is attached to the inner, upper surface of each of the legs 14. Each of the arms 20 is vertically adjustable in relation to the leg 14 and is adapted to have its upper surface extend beyond the upper surface of the leg 14. Adjustability of the arms 20 can be achieved by forming oval apertures (not shown) in the arms and engaging them with screws engaged to the leg 14. The other piece of the blocking fixture is a pin block 22 comprising a cast pin block housing 24 enclosed by a frame formed from a pair of side walls 26 extending from and connecting end walls 28. The end walls 28 are in spaced parallel relation to each other as are the side walls 26. The pin block housing 24 is engaged within the frame formed by the end walls 28 and the side walls 26 by screwing the walls to the housing via screws such as illustrated at 29. The pin block housing 24 includes a rectangular base 32 and a series of upstanding walls 33 which separate the base into a group of compartments. The side walls 26 and the end walls 28 extend down below the lower surface of the base 32 to provide support portions 34. The base 32 has a pattern of .125 inch diameter holes 36 formed therethrough which are spaced from each other on one inch centers. The upper surface of the end walls 28 is on the same plane as the upper surfaces of the side walls 26. A strip of metal 38 is provided along the length of each of the side walls 28 a predetermined distance above the upper plane of the pin block housing 24. The strip of metal 38 and the upper surface of the pin block housing 24 defines a channel 46.

An actuation screw 40 is threadingly engaged through each of the end walls 28 at its midline in close proximity to their respective upper surfaces for a purpose to be set forth hereinafter.

The pin block 22 includes a pin locking plate 42 having a pattern of through apertures 44 which geometrically is identical to the pattern of holes 36 of the base 32. The apertures 44 are of slightly larger diameter than the holes 36. The pin locking plate 42 is placed in the channels 46 so that it can move laterally therein. A series of hardened, cylindrical, stainless steel pins 48, equal in weight to each other and having a diameter of 1/8 inch, are provided to be received in the holes 36 and the apertures 44.

The assembled pin block 22 is placed over the glass work plate 18 with the support portions 34 resting on the upper edges of the arms 20, which have been properly adjusted, as to height, spacing the base 32 from the work plate 18. Each of the pins 48 is passed through an aperture 44 in the pin locking plate 42 and thence through the aligned hole 36 in the base 32. The pins 48 are axially movable in the holes 36 and apertures 44 and have an outside diameter small enough to allow some lateral movement. Note that there is the possibility of more lateral movement of the pins in the apertures than in the holes. In the unlocked position the lower terminal ends of the pins 48 rest on the glass work plate 18 under the force of gravity alone. The pins 48 when engaged against the glass work plate 18 exert the same force per unit area over the total plate surface. Since the surface of the glass work plate 18 is of varying heights the height of the pins 48 above the surface of the pin locking plate 42 will not be uniform. The terminal ends of the pins will conform to the topography or contour of the surface of the glass work plate 18. When all the pins are in place with their lower, arced terminal ends resting on the upper surface of the glass work plate 18, the pin locking plate 42 is moved laterally, a predetermined distance by rotating one of the actuation screws 40 to bear against an edge of the locking plate 42. The lateral movement of the pin locking plate 42 moves the end of the pins 48 which are close to the apertures 44, while the portions of the pins 48 in the holes 36 are substantially held in place, to thereby lock them in place. The locking action occurs because each pin binds against opposite points on the wall of its hole 38 and at one point on the wall of its aperture 44. Some flexing of the pins occur which reduces the precision that is necessary in the alignment of the apertures in the locking plate and the holes in the pin block housing. Each of the pins 48 acts as a cantilever spring. It has been found that a lateral force of 1 lb. on each of the pins 48 by the pin locking plate 42 locks the pins 48 against an axial force of about 10 lbs.

After the pins 48 are locked in place the pin block 22 together with the glass work plate 18 is removed from the support members 12 and inverted so that the surface of the glass work plate 18 which was in contact with the sponge block 16 is now exposed for working. Thus, the opposite surface of the glass work plate rests on the rigid bed provided by the pins 48. Nylon set screws 50 are threadingly engaged through threaded apertures in the support portions 34 to abut against the edges of the glass work plate 18 to prevent lateral movement of the work plate. Nylon or some other material softer than glass is used in the set screws 50 to avoid chipping the glass working plate. After the set screws 50 are tightened the space between the inner surface of the side and end walls and the edges of the glass work plate are filled with a suitable sealing compound. Although the sealing is not absolutely necessary, it does prevent lapping slurry from entering the interior of the pin block during the grinding and/or polishing process which might prevent or inhibit the free axial movement of the pins 48 when pin block 22 is reused.

The assembly of the pin block 22 and the glass work plate 18 is placed on a grinding wheel and ground to the required flatness. If a polishing operation is required the glass work plate can be polished while supported on the pin block or can be removed from the pin block and polished using other supports well known in the art.

Figure 4:
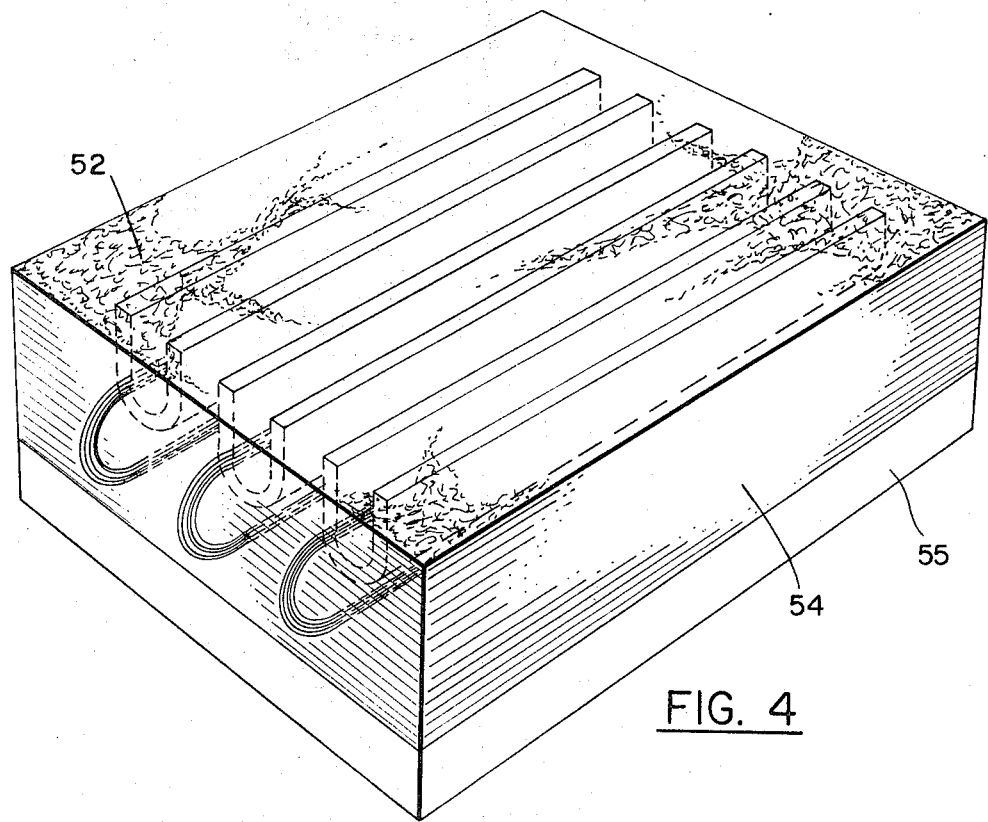
FIG. 4 is a schematic drawing of a blocking fixture illustrating a second embodiment of the invention.

As shown in FIG. 4 in the place of the sponge block 16 and pin block 22 combination a mixture of oil and iron powder 52 may be utilized similar to the mixture used in some types of fluid magnetic clutches. The mixture is placed on an electro-magnetic surface plate 54 and current is applied to the plate inducing a magnetic field urging the iron powder in the mixture to line up in relation to the magnetic flux of the field causing the mixture to become solid. The viscosity of the mixture can be varied by varying the viscosity of the oil and the amount of iron powder. Basically the work piece is floated on the mixture in a position of neutral buoyancy. After the work piece is placed on the bed, the bed is shaken or vibrated via suitable conventional vibrating apparatus 55 so that the surface of the mixture will conform to the work piece surface against which it is engaged. After vibration, current is turned on actuating the magnetic field and freezing the mixture so that its upper surface is fixed in its conformation to the surface of the work piece. The work piece may then be ground and/or polished glass side up or by inverting the apparatus onto a grinding instrument. Plastic screws are used against the edges of the work piece to prevent its lateral movement during the manufacturing operations.

It is also possible to utilize a bed of extremely small bearings having an outside diameter of 1/32 inch or less or to utilize a bed of extremely small particles, such as sand, which may be irregular in configuration, to support the glass work piece 18. The bed is vibrated conforming the surface of the bearings or particles to the contours of the work piece surface. The exposed surface of the glass work piece may then be laterally held and ground and/or polished using means similar to that used with the embodiments disclosed herein.

Figure 5:
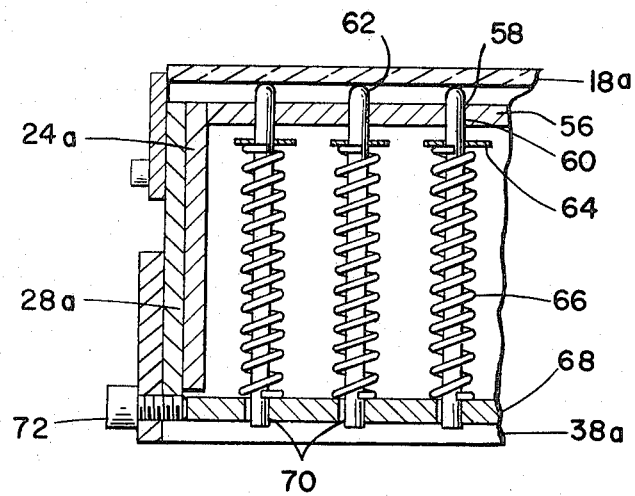
FIG. 5 is a cross section broken off of a blocking fixture illustrating a third embodiment of the invention.

There is shown in FIG. 5 a section of a box-like pin block housing 24a comprising a roof portion 56, a frame for the pin block housing 24a comprising side walls (not shown) and end walls 28a each pair of which is in spaced parallel relation to each other and attached to the pin block housing by screws (also not shown). The roof portion 56 has a pattern of holes 58 formed therethrough similar to the hole pattern formed in the base 32. The steel pins 60 to be used as support elements have a forward terminal end 62 with a short rod 64 passed transversely through the pin 60 in close proximity to the forward terminal end 62. A helical spring 66 circumscribes each of the pins 60 rearwardly of and in butting relation to the rod 64. Each of the side walls has a strip of metal 38a attached to and extending along its inner surface, in spaced parallel relation to the lower surface of the pin block housing 24a. A locking plate 68 has a series of apertures 70 formed therethrough in a pattern conforming to the hole pattern formed in the roof portion 56. The pins 60 are engaged to the pin block housing 24a by passing a pin through the hole 58 and its corresponding aligned aperture 70. Each of the helical springs 66 rests on the locking plate 68 and has a diameter greater than the apertures 70. The helical springs 66 are in a relaxed state neither extended or compressed. The glass work plate 18a can now be placed on the forward terminal ends 62 of the pins 60 moving each of the pins axially to conform to the contours of the surface of the glass work plate against which they are engaged as the helical springs compress. An actuating screw 72 is threadingly engaged to the pin block having its terminal end adapted to engage a side edge of the locking plate 68 so that on rotation the locking plate will move laterally causing the pins 60 to bind in a manner similar to the locking action of the pins 48 by the pin locking plate 42. The glass working plate is then laterally held by nylon set screws and may now be ground and/or polished in a manner well known in the art.

Figure 6:
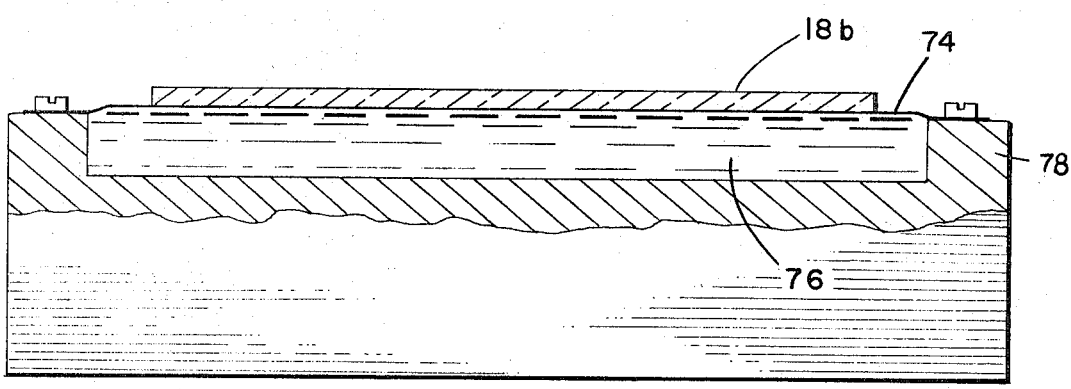
FIG. 6 is a cross section broken off of a support which can be used with the pin block of FIG. 1.

As shown in FIG. 6 the work plate 18b may be supported on a thin membrane 74 which covers a bath of mercury 76 rather than on a sponge block. The work plate 18b is held at substantially neutral buoyancy with this device and may then be engaged with a pin block as disclosed hereinbefore. The mercury is carried in a tank 78.

The blocking methods and apparatus described hereinbefore can also be utilized in the grinding of lenses. In this case the pins will be passed through holes, formed in a pin block having a spherical base, and through apertures formed in a spherical locking plate. The locking plate can be rotated causing movement of the pins to bring about positive locking action.

I claim:

1. Apparatus for supporting an object to be worked on, said object having at least two surfaces, each of said surfaces having a free undistorted contour, said apparatus comprising:
   a. housing means, said housing means including first and second relatively movable portions, said first portion being provided with a plurality of through holes, said second portion being provided with a plurality of apertures in a pattern corresponding to said hole pattern provided in said first portion;
   b. surface engagement means in the form of a plurality of automatically and simultaneously movable pins, each of said pins having a longitudinal axis, said pins being received in said holes and said apertures and movable in a direction substantially parallel to said axes; and /
   c. means, provided on said housing means, for moving said second part relative to said first part to substantially simultaneously lock all of said pins against axial movement.

2. The apparatus as set forth in claim 1 wherein said pins are elongated and act as cantilever springs, said relative movement between said first part and said second part binding each pin in its respective hole and aperture.

3. The apparatus as set forth in claim 2 wherein said first portion includes guide means and said second portion is a plate slidably received within said guide means.

4. The apparatus as set forth in claim 3 further including means to prevent lateral movement of said object relative to said pins, said lateral movement prevention means being secured to said first portion.

5. The apparatus as set forth in claim 3 wherein said pins are spring loaded.

6. The apparatus as set forth in claim 1 further including means, engageable with one of said two surfaces of said object, for supporting said object at neutral buoyancy prior to said pins being brought into engagement with the other of said two surfaces.

7. The apparatus as set forth in claim 6 further including means for positioning said housing means relative to said neutral buoyance supporting means.

8. Apparatus for supporting an object to be worked on, said object having at least two surfaces, each of said surfaces having a free undistorted contour, said apparatus comprising:
   a. means to float said object at neutral buoyancy, said neutral buoyance float means engaging at least portions of one of said two surfaces;
   b. a base;
   c. surface engagement means including a plurality of automatically and simultaneously movable elements, said elements being movable to a position where at least some of said elements engage the other of said two surfaces to thereby impart into said surface engagement means a contour substantially conforming to said free, undistorted contour of said other of said two surfaces; and
   d. means provided on said base for acting on said elements to substantially simultaneously lock all of said elements to fix the position of said elements whereby said imparted contour may be rigidified to provide a rigid support for said object having the same contour as said other of said two surfaces.

9. A method of rigidly blocking an object having at least two surfaces, each of said surfaces having a free, undistorted contour, said method comprising:
   a. engaging one of said surfaces with means to float said object at neutral buoyance;
   b. engaging a plurality of automatically and simultaneously movable elements with said other of said two surfaces; and
   c. simultaneously locking all of said movable elements to thereby provide a rigid support that substantially conforms to said free, undistorted contour of said other of said two surfaces.

10. The method as set forth in claim 9 further including the step of locking said object against movement which is lateral with respect to said other of said two surfaces.

11. The method of rigidly blocking a relatively thin glass plate having at least two surfaces, each of said surfaces having a free, undistorted contour, said method comprising:
   a. providing a bed formed of a plurality of automatically and simultaneously movable elements, said bed having an exposed surface;
   b. contacting said plate on said exposed surface such that some of said elements engage one of said plate surfaces;
   c. vibrating said bed to move at least some of said elements to thereby impart into said exposed surface a contour that substantially conforms to said free, undistorted contour of said one plate surface; and
   d. holding said plate against movement transverse to said exposed surface.

12. The method as set forth in claim 11 further including the step of simultaneously applying a locking force of all of said movable elements to fix the position of said movable elements to thereby rigidify said imparted contour.

13. A process for rigidly blocking a glass plate in its free state shape with a blocking device including a bed of movable elements, said plate having first and second surfaces and being relatively thin compared to its length and width, said process comprising:
   a. floating said plate on said bed by engaging one of said plate surfaces with at least a portion of said movable elements;
   b. locking said movable elements so as to rigidify said bed to thereby provide a rigid support for said plate which conforms to the free state shape of said one plate surface; and
   c. locking said plate only against movement which is lateral with respect to said one plate surface.

* * * * *

UNITED STATES PATENT OFFICE
CERTIFICATE OF CORRECTION

Patent No. 3,855,737          Dated December 24, 1974

Inventor(s) James A. Clark

It is certified that error appears in the above-identified patent and that said Letters Patent are hereby corrected as shown below:

Col. 1, line 54, after "which" delete "cue" and substitute therefor --due--.

Signed and sealed this 18th day of February 1975.

(SEAL)
Attest:

RUTH C. MASON
Attesting Officer

C. MARSHALL DANN
Commissioner of Patents
and Trademarks